Figures 1, 2, 3:
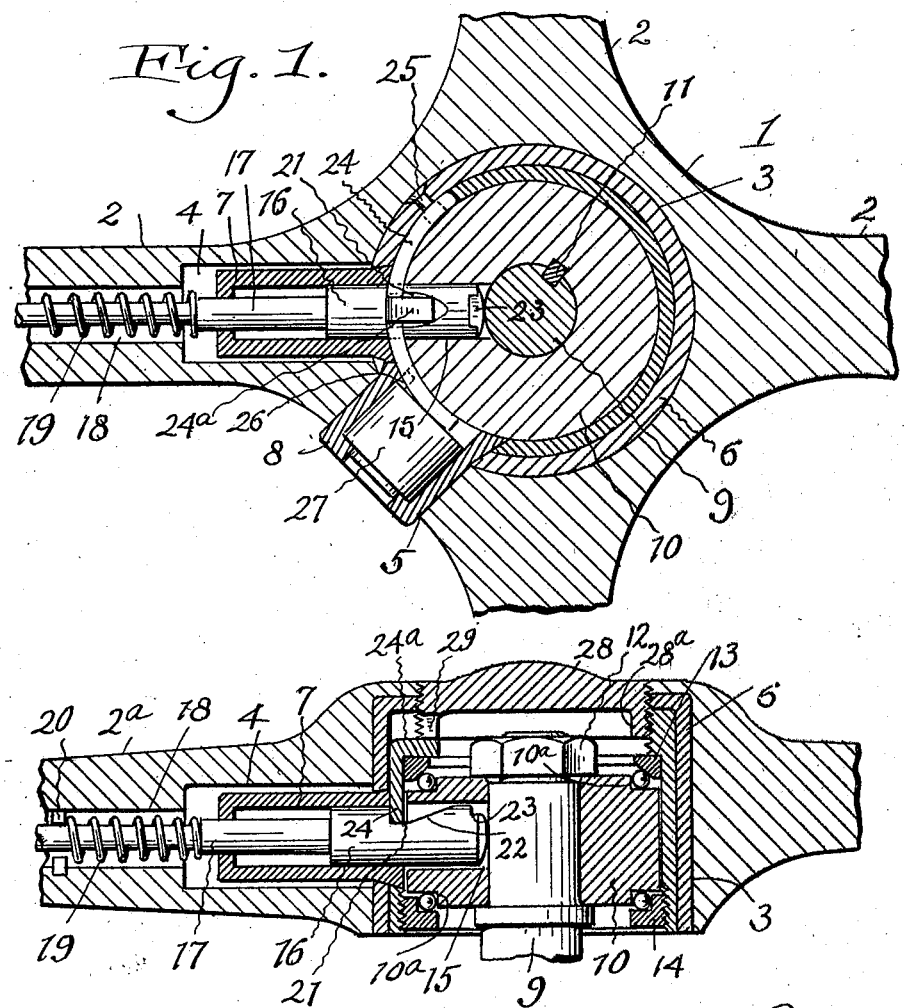

Dec. 4, 1923.

A. E. BRONSON 1,475,928

STEERING WHEEL MECHANISM

Filed Dec. 16, 1922

Inventor
Adelbert E. Bronson
by
Thurston Kwis & Hudson
attys.

Patented Dec. 4, 1923.

1,475,928

UNITED STATES PATENT OFFICE.

ADELBERT E. BRONSON, OF CLEVELAND, OHIO.

STEERING-WHEEL MECHANISM.

Application filed December 16, 1922. Serial No. 607,386.

*To all whom it may concern:*

Be it known that I, ADELBERT E. BRONSON, a citizen of the United States, residing at Cleveland, in the county of Cuyahoga and State of Ohio, have invented a certain new and useful Improvement in Steering-Wheel Mechanism, of which the following is a full, clear, and exact description.

This invention relates to a steering wheel of the type which may be released from its engagement with a steering shaft so that it may freely spin upon the steering shaft, together with locking mechanism which will prevent restoration of the wheel to its engaging position, so that a motor vehicle equipped with a wheel of this character will be "locked" against tampering by virtue of the fact that the steering wheel is loose on the shaft and so the vehicle can not be steered, even if the engine be started, or the vehicle pushed along.

One of the objects of the invention is to provide mechanism of simple character which is lock-controlled, and which will hold in disengaging position a bolt or latch which normally serves to connect the steering wheel with the steering post.

A further object of the invention is to provide a construction in which the latch when moved to position to retain the bolt in disengaging position, will be moved to a position in which it will lock the cap which closes one end of the opening in the steering wheel against removal, thereby to prevent access to the inside of the hub of the steering wheel, which of course would defeat the whole purpose of locking.

Reference should be had to the accompanying drawings forming a part of this specification, in which Fig. 1 is a partial plan view of the steering wheel and steering post in assembled relation; Fig. 2 is a vertical section of the showing in Fig. 1; Fig. 3 is a perspective view of a latch.

In the drawings, the steering wheel is not completely shown, but it will be understood that the steering wheel is of usual construction in its broad aspect, that is to say, comprising a central hub portion with radiating arms, which arms have secured at their outer ends a rim which is adapted to be grasped by the hands of the manipulator in steering a motor vehicle.

Referring to the drawings, there is shown in Figs. 1 and 2 a portion of a steering wheel which has a central hub portion 1 with radiating arms 2. The hub portion is provided with a central recess or opening 3 which extends entirely through the hub, and communicating with this opening there is another opening 4 which is formed in the arm 2ª, this opening 4 being axially arranged with respect to the arm. There is also an opening in the hub which is indicated at 5, this opening extending at right angles with respect to the first mentioned opening in the hub.

This opening in the hub receives a cup-shaped member 6 which is preferably made of hard steel or similar material, which is impervious to cutting tools. The recess 4 is occupied by a sleeve member 7 which at its inner end extends through a suitable opening in the cup 6. The member 7 is formed of hardened steel or similar material, which is resistant to cutting tools. Similarly there is a cup-shaped member 8 which occupies the opening 5 and extends through a suitable opening in the cup-shaped member 6. This is made of hardened steel so that all the vital parts of the mechanism connected with the steering wheel are encased in an armor which prevents cutting tools from injuring the vital parts of the mechanism.

The upper end of a steering shaft is indicated at 9, and at its outer end receives a head member 10 which is secured upon the end of the shaft in any desired manner, as by means of a key 11. The end of the shaft 9 is threaded and receives a nut 12 which serves to hold the head member 10 in position. The head member 10 has grooves at the top and bottom thereof, such as indicated at 10ª, which serve as ball races, and there are ring members 13 and 14 which form the outer rings for ball races, and are carried by the hub of the steering wheel, so that the steering wheel under conditions which are to be named later, may freely turn upon the steering shaft.

The head member 10 is provided with a recess 15 which is normally in line with the sleeve 7.

In the sleeve 7 there is a bolt 16 which is adapted to extend into the opening 15 in the head 10, and when in this position the steering wheel and the steering shaft are connected to each other in an operative way, so that rotation of the wheel will cause rotation of the shaft. The bolt member 16 has a rod 17 secured thereto, which extends through a channel 18 which is axial with respect to the arm 2ª, and in this opening 18 there is a spring 19 which at one end bears against a suitable ledge 20, and at its opposite end bears against a shouldered portion of the rod 17, so that the spring 19 normally urges the bolt 16 inwardly and into a connecting or engaging position. The bolt on the upper surface is provided with a groove 21 which has a slanting side 22. The bolt also is provided adjacent the end with a square shouldered recess 23.

Pivoted to the hub is a rounded latch member 24 which is pivoted at one end as indicated at 25. This latch member extends transversely with respect to the bolt 16, and when the bolt is in its inward position the latch normally occupies the bottom of the groove 22.

When the bolt 16 is withdrawn the latch 24 is elevated by sliding up the inclined surface 22, and upon continued movement of the bolt 16 eventually the latch 24 will drop into the groove 23, which will prevent the bolt 16 from returning to its engaging position until the latch 24 is raised.

The latch extends beyond the bolt 16, and at its end is in position to be engaged by an arm 26 which is rotated by a suitable key-operated lock 27, which is contained within the cup-shaped armored member 8.

When the bolt 16 has been withdrawn so that the latch occupies the groove 23, and it be desired to return the bolt to re-engaging position, the lock 27 is operated to raise the latch, whereupon the bolt 16 will shoot into engaging position under the action of the spring 19.

One end of the opening 3 in the hub 1 of the steering wheel is closed by means of a cap 28, this cap being threaded on a portion of its outer surface, and engaging with threaded surfaces on the inner wall of the opening in the hub 1. This cap has a flange 28ª, and at one portion thereof the flange has a notched out portion or groove 29 which, when the cap is screwed to its innermost position overlies a short extension 24ª on the latch 24. So long as the latch 24 is in its downward position, such as shown in Fig. 2, the cap 28 may be removed and replaced with impunity. When, however, the latch 24 moves upwardly, due to the inward movement of the bolt 16, the extension 24ª moves into the groove 29, and so long as the latch 24 is held in elevated position the part 24ª occupies the groove 29, and therefore the cap 28 can not be removed. This locking of the cap 28 is accomplished at the time when the bolt 16 is withdrawn, or in other words, when the steering wheel is free to spin upon the steering shaft, and therefore access to the interior or recess of the hub is prevented.

Having described my invention, I claim:—

1. The combination with a steering shaft member of a steering wheel member said wheel being mounted for free rotation upon said shaft, a bolt carried by one of said members, the other of said members being provided with an opening in which said bolt may engage to secure the members to rotate in unison, a detent carried by the member carrying the bolt and movable when the bolt is withdrawn to disconnect said members, to engage said bolt to retain the same in retracted position.

2. The combination with a steering shaft member of a steering wheel member said wheel being mounted for free rotation upon said shaft, a bolt carried by one of said members the other of said members being provided with an opening in which said bolt may engage to secure the members to rotate in unison, a pivoted detent carried by the member carrying the bolt and movable when the bolt is withdrawn to disconnect said members, to engage said bolt to retain the same in retracted position, and key-operated mechanism to move the detent to release the bolt.

3. The combination with a steering shaft member of a steering wheel member said wheel being mounted for free rotation upon said shaft, a bolt carried by one of said members, the other of said members being provided with an opening in which said bolt may engage to secure the members to rotate in unison, said bolt being provided with a notch, a pivoted detent carried by the member carrying the bolt and extending transversely with respect to the bolt, whereby when the bolt is withdrawn to disconnect said member, the detent will drop into the notch in the bolt to hold the bolt in retracted position, and means for moving the latch to release the bolt.

4. The combination with a steering shaft member of a steering wheel member, said wheel being mounted for free rotation upon said shaft, a bolt carried by one of said members, the other of said members being provided with an opening in which said bolt may engage to secure the members to rotate in unison, said bolt member being provided with a transversely extending notch adjacent the end thereof, a pivoted detent carried by the member carrying the bolt and extending transversely with respect to the bolt said detent being adapted to drop into said notch in the bolt and to retain the same in retracted position when the bolt is retracted, and key-operated mechanism for moving the detent to release the bolt.

5. The combination with a steering shaft member of a steering wheel member having a hub with a central opening, a cap for closing one end of said opening said wheel being mounted for free rotation upon said shaft, a bolt carried by one of said members, the other of said members being provided with an opening in which said bolt may engage to secure the members to rotate in unison, a detent carried by the member carrying the bolt and movable when the bolt is withdrawn to disconnect said members, to engage said bolt to retain the same in retracted position, and also to engage a portion of said cap to prevent its removal from the hub.

6. The combination with a steering shaft member, of a steering wheel member having a hub with a central opening, a cap for closing one end of said opening said wheel being mounted for free rotation upon said shaft, a bolt carried by one of said members, the other of said members being provided with an opening in which said bolt may engage to secure the members to rotate in unison, a detent carried by the member carrying the bolt and extending above the bolt said bolt being provided with a groove in which the detent is seated when the bolt is in engaging position said groove having a slanting side whereby the detent is moved upwardly when the bolt is moved to retracted position said detent being provided with a part which engages with a portion of said cap when the detent is raised thereby to prevnt removal of the cap from the hub.

7. The combination with a steering shaft member, of a steering wheel member having a hub with a central opening, a cap for closing one end of said opening said wheel being mounted for free rotation upon said shaft, a bolt carried by one of said members, the other of said members being provided with an opening in which said bolt may engage to secure the members to rotate in unison, said cap having a skirt with a notch therein, a detent carried by the member carrying the bolt and extending transversely with respect to the bolt said detent having an offset portion which is in line with the notch in the skirt of the cap, co-operating means upon the latch and bolt whereby the latch is raised when the bolt is withdrawn to disengaging position, and whereby the said extension on the detent is moved into the notch in the skirt of the cap thereby to prevnt removal of the cap.

8. The combination with a steering shaft, member, of a steering wheel member having a hub with a central opening, a cap for closing one end of said opening said wheel being mounted for free rotation upon said shaft, a bolt carried by one of said members, the other of said members being provided with an opening in which said bolt may engage to secure the members to rotate in unison, the said cap having a skirt portion which is provided with a notch and pivoted detent carried by the member which carries the bolt, said detent extending transversely above the bolt, said detent being provided with an extension which normally lies below the notch in the skirt of the cap, the said bolt being provided with a recess which the detent normally occupies, the recess in the bolt being provided with a slanting side whereby when the bolt is withdrawn to disengaging position the detent is raised and the extension on the detent occupies the notch in the flange of the cap thereby to prevent removal of the cap.

In testimony whereof, I hereunto affix my signature.

ADELBERT E. BRONSON.